(12) United States Patent
Naik et al.

(10) Patent No.: US 11,820,458 B2
(45) Date of Patent: Nov. 21, 2023

(54) IN-WHEEL ELECTRIC ALL TERRAIN VEHICLE

(71) Applicant: Powerland Agro Tractor Vehicles Private Limited, Margao (IN)

(72) Inventors: Tej Narayan Naik, Margao (IN); Narayan Pundalik Naik, Margao (IN); Amit Sukumar Santra, Mangor (IN)

(73) Assignee: Powerland Agro Tractor Vehicles Pvt Ltd., Margao-Goa (IN)

( * ) Notice: Subject to any disclaimer, the term of this patent is extended or adjusted under 35 U.S.C. 154(b) by 80 days.

(21) Appl. No.: 17/111,553

(22) Filed: Dec. 4, 2020

(65) Prior Publication Data

US 2021/0171147 A1 Jun. 10, 2021

(30) Foreign Application Priority Data

Dec. 4, 2019 (IN) .............................. 201921040187

(51) Int. Cl.
*B62K 5/01* (2013.01)
*B60K 7/00* (2006.01)

(52) U.S. Cl.
CPC .............. *B62K 5/01* (2013.01); *B60K 7/0007* (2013.01)

(58) Field of Classification Search
CPC ...... B62K 5/01; B60K 7/0007; B60K 17/354; B60K 17/356; B60Y 2200/124
See application file for complete search history.

(56) References Cited

U.S. PATENT DOCUMENTS

| 5,004,061 | A * | 4/1991 | Andruet | B60L 50/52 |
| | | | | 180/65.6 |
| 6,851,496 | B2 * | 2/2005 | Prucher | B60K 7/0007 |
| | | | | 180/65.1 |
| 9,080,659 | B2 * | 7/2015 | Kobayashi | H02K 7/116 |
| 9,731,599 | B2 * | 8/2017 | Gagnon | B60K 1/00 |
| 9,862,264 | B2 * | 1/2018 | Lampic | B60K 7/0007 |
| 10,118,477 | B2 * | 11/2018 | Borud | B60L 53/14 |
| 10,272,913 | B2 * | 4/2019 | Boisvert | B60L 58/12 |
| 10,381,895 | B2 * | 8/2019 | Roberts | B60B 27/0015 |
| 2010/0089671 | A1 * | 4/2010 | Trunkenpolz | B60K 6/485 |
| | | | | 180/65.23 |
| 2017/0110933 | A1 * | 4/2017 | Michel | B60L 3/0061 |
| 2018/0009500 | A1 * | 1/2018 | Lovold | B62K 5/01 |
| 2019/0305638 | A1 * | 10/2019 | Chi-Hsueh | H02K 21/145 |
| 2020/0324813 | A1 * | 10/2020 | Hsu | B60G 3/14 |
| 2021/0094406 | A1 * | 4/2021 | Payne | B60B 27/0047 |
| 2022/0080822 | A1 * | 3/2022 | Dong | B60K 6/448 |

* cited by examiner

*Primary Examiner* — Paul N Dickson
*Assistant Examiner* — Tiffany L Webb
(74) *Attorney, Agent, or Firm* — Rajendra Gurudas Sardesai

(57) ABSTRACT

An in-wheel electric all-terrain vehicle (100) having a powertrain (126) to provide power drive from the engine (102) to at least one of the right front wheel (104), the left front wheel (106), the right rear wheel (108), and the left rear wheel (110), wherein the powertrain (126) includes the engine (102), one or more drive shafts (128), and a final drive (130); an electric in-wheel motor assembly (132) mounted inside each of the four wheels (104, 106, 108, 110), wherein the electric in-wheel motor assembly (132) includes a main shaft (134), one or more stator coils (136), a stator holder (138), a stator coil winding (140), one or more magnets (142), a magnet ring holder (144), one or more bearings (146), a casing (148), one or more internal and external circlips (150).

13 Claims, 7 Drawing Sheets

IN-WHEEL ELECTRIC ALL TERRAIN VEHICLE

FIELD OF INVENTION

The present embodiment generally relates all-terrain vehicles (ATVs). More particularly, the present invention relates to configuring electric powertrain within the wheels of the vehicle for efficient vehicle dynamics on a variety of terrains.

BACKGROUND OF THE INVENTION

An all-terrain vehicle (ATV) is constructed for access on undeveloped terrain, probably having rough and uneven topography with either no proper roadway or in the presence of roads, mostly having irregular roads. In particular, the ATV is designed for easily traversing steep slopes and irregular pathways without tipping or toppling of the vehicle. Presently, the all-terrain vehicles (ATVs) are introduced with a powertrain on the chassis for rough terrains and irregular passages. Generally, such ATVs are designed with single or double seating and further comprise a gearbox, some differentials, a transfer case, a propeller shaft and more such electric components obvious to a skilled person.

Further, a large number of vehicle manufacturers are increasingly focusing on designing and/or manufacturing all-terrain vehicles for rough terrains in order to achieve an all-wheel or a four-wheel drive performance. A four-wheel drive helps improve a vehicle's traction or grip, and may act as a life-saving essential on unruly or unpredictable terrains. In such conventional ATV vehicles, the ATV typically comprises a frame having front, rear, right, and left sides; an engine and two wheel axes disposed on the frame. The engine is disposed in a centre position, and pluralities of wheels are disposed on said wheel axes.

Although this relative positioning of several components of the ATV provides a compact construction for the ATV, however said construction is limited by both technical and monetary limitations. One of the limitations of said conventional ATV design is increased weight on the chassis of the vehicle, which is further increased by the conventional motor and gearbox driveline being installed on the chassis itself. It is pertinent to note that the chassis is a frame-like structure of the vehicle on which other vehicle components are mounted, and plays a critical role in overall functioning and efficiency of the vehicle. Therefore, the overall weight of the chassis should be kept at minimum in order to avoid adverse effects which may deplete the strength and operability as well as the dynamics of the vehicle.

Therefore, in light of the above-mentioned limitations of the existing ATV systems, there exists a need of an efficient ATV design without compromising on the weight and vehicle dynamics. More particularly, there exists a need to eliminate traditional motor and gearbox driveline from the chassis by integrating electric powertrain within the vehicle's wheels for improved vehicle dynamics.

SUMMARY OF INVENTION

In light of the limitations of the existing conventional systems as discussed above, it is evident that there arises a need of an efficient electric powertrain to be configured within the wheels of the all-terrain vehicles for substantially overcoming the above-mentioned limitations.

The present disclosure portrays a reduction in the overall weight of the vehicle by providing a lighter and flexible electric ATV configured for a variety of terrains. Another object of the present disclosure is to incorporate the electric powertrain within the wheels of the vehicle by mounting an electric in-wheel motor assembly inside the wheels. Yet another object of the present disclosure is to eliminate the use of axle and differential drives, and consequently increase ground clearance with high suspension mechanism which guides appropriate traversal of the vehicle. Another object of the present disclosure is to improve handling, traction and stability over corners by introducing individual and independent motors within each wheel which in-turn facilitates equal torque distribution to each wheel and also facilitates flexible speed variations. Yet another object of the present disclosure is to significantly reduce the harmful emissions observed in conventional systems. Another object of the present disclosure is to significantly reduce noise and vibrations produced while using the electric motors as a powertrain.

In an aspect, embodiments of the present disclosure provide an in-wheel electric all-terrain vehicle (100), wherein the in-wheel electric all-terrain vehicle (100) includes an engine (102) a right front wheel (104), a left front wheel (106), a right rear wheel (108), a left rear wheel (110), a chassis (112), a steering wheel mechanism (114), a straddled seat (116), at least four tyres (118), a suspension mechanism (120), shock absorbers (122), one or more linkages (124). The in-wheel electric all-terrain vehicle (100) includes a powertrain (126) to provide power drive from the engine (102) to at least one of the right front wheel (104), the left front wheel (106), the right rear wheel (108), and the left rear wheel (110), wherein the powertrain (126) includes the engine (102), one or more drive shafts (128), and a final drive (130); an electric in-wheel motor assembly (132) mounted inside each of the four wheels (104, 106, 108, 110), wherein the electric in-wheel motor assembly (132) includes a main shaft (134), one or more stator coils (136), a stator holder (138), a stator coil winding (140), one or more magnets (142), a magnet ring holder (144), one or more bearings (146), a casing (148), one or more internal and external circlips (150).

BRIEF DESCRIPTION OF THE DRAWINGS

Other objects, features, and advantages of the embodiment will be apparent from the following description when read with reference to the accompanying drawings. In the drawings, wherein like reference numerals denote corresponding parts throughout the several views.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments of the present disclosure provide an electric all-terrain vehicle (E-ATV), wherein an electric powertrain and in-wheel motor assembly are incorporated within the wheels of the vehicle. The E-ATV comprises a unique design where the conventional motor and gearbox are removed from the chassis.

Throughout the present disclosure, the term "vehicle" as used herein refers to electric vehicle, a hybrid vehicle or a combination thereof. Furthermore, the all-terrain vehicle as used herein may include utility terrain vehicles equipped with in-wheel drive motors which may be upgraded to remote, autonomously operated unmanned vehicle for various use cases such as but not limited to autonomous operation in farms, cultivating spraying, harvesting, lawn mower, goods carrier with trailer attachments. Moreover, the vehicle may not be restricted to use for defence battalion vehicle, personal adventure sports applications, and so forth.

Throughout the present disclosure, the term "chassis" refers to a frame like skeleton of the vehicle for mounting various components thereon. Furthermore, the chassis may include one or more supporting member, one or more links, and the like.

Figure 1:
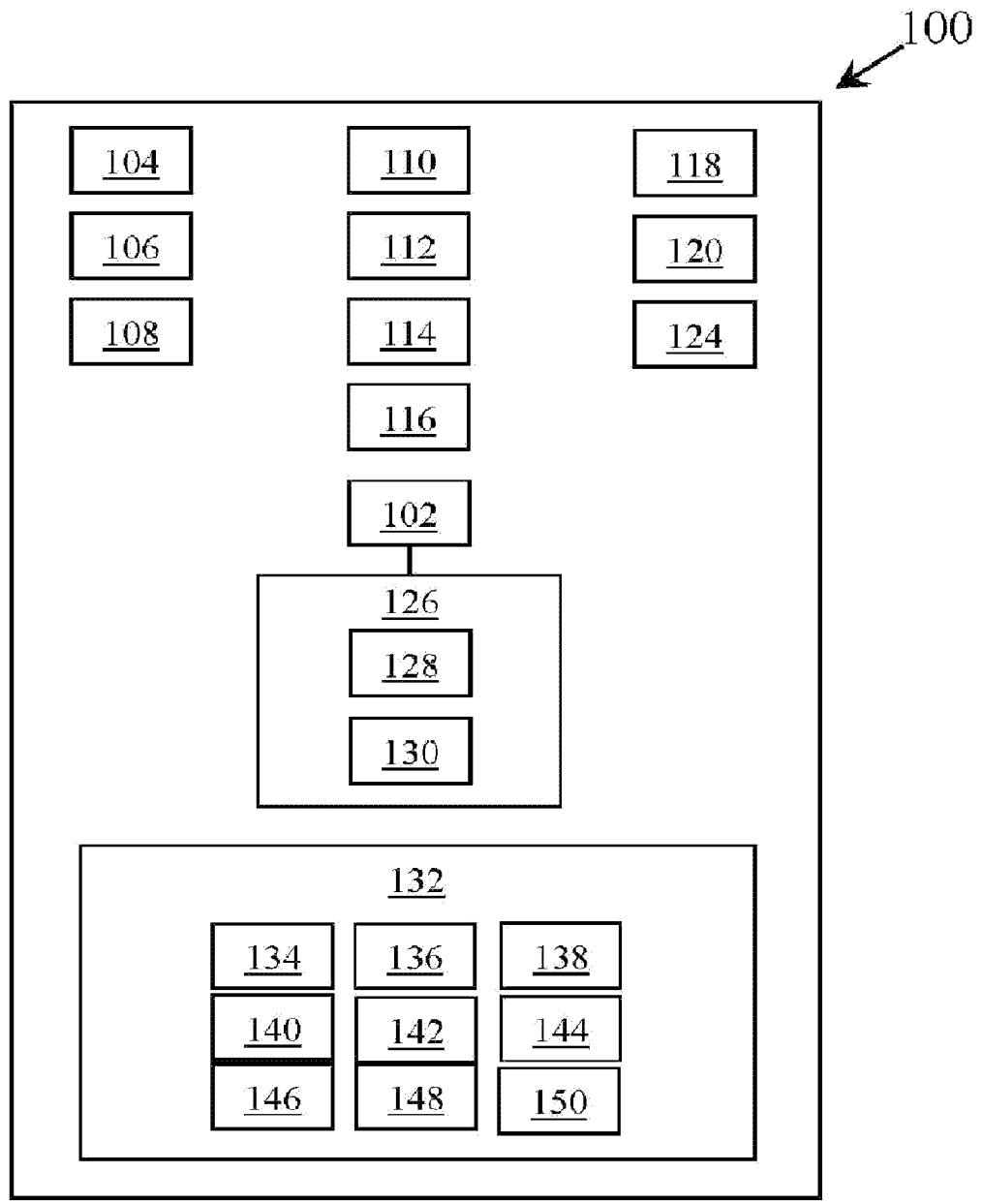
FIG. 1 illustrates a block diagram of an in-wheel electric all-terrain vehicle (100), according to an embodiment herein.

Referring to FIG. 1, the figure illustrates a block diagram of an in-wheel electric all-terrain vehicle (100), according to an embodiment herein. The in-wheel electric all-terrain vehicle (100) includes an engine (102) a right front wheel (104), a left front wheel (106), a right rear wheel (108), a left rear wheel (110), a chassis (112), a steering wheel mechanism (114), a straddled seat (116), at least four tyres (118), a suspension mechanism (120), shock absorbers (122), and one or more linkages (124). Furthermore, the in-wheel electric all-terrain vehicle (100) further includes a powertrain (126) to provide power drive from the engine (102) to at least one of the right front wheel (104), the left front wheel (106), the right rear wheel (108), and the left rear wheel (110), wherein the powertrain (126) includes the engine (102), one or more drive shafts (128), and a final drive (130); as well as an electric in-wheel motor assembly (132) mounted inside each of the four wheels (104, 106, 108, 110), wherein the electric in-wheel motor assembly (132) includes a main shaft (134), one or more stator coils (136), a stator holder (138), a stator coil winding (140), one or more magnets (142), a magnet ring holder (144), one or more bearings (146), a casing (148), one or more internal and external circlips (150).

According to an embodiment, the in-wheel electric all-terrain vehicle (100) includes the engine (102) for power to be transmitted to the wheels. In an instance, the engine (102) may include but not be limited to: compression ignition engines, petrol engines, battery powered, and/or hybrid vehicles. Furthermore, the in-wheel electric all-terrain vehicle (100) includes the right front wheel (104), the left front wheel (106), the right rear wheel (108), and the left rear wheel (110) to provide movement in all four directions such as forward, backward, right and left, respectively. The in-wheel electric all-terrain vehicle (100) is configured to shift the alignments of the each of the wheels and may be realigned back to the same position. Furthermore, the in-wheel electric all-terrain vehicle (100) includes the chassis (112) as a framework to support all the components of the engine. Furthermore, the in-wheel electric all-terrain vehicle (100) may include a rechargeable battery pack (111) to provide power to the engine (102).

In an embodiment, the in-wheel electric all-terrain vehicle (100) may include an autonomous vehicle drive (103) configured to control the drive remotely. In another embodiment, the in-wheel electric all-terrain vehicle (100) also includes an actuator (105) arranged to the chassis, wherein the actuator is configured to enable an 20 engaging and disengaging mechanism of the brakes (107) to the wheels. Furthermore, the actuator as used herein refers to a device that uses a form of power to convert a control signal into mechanical motion. Traditionally, the actuators may use air, hydraulic fluid, or electricity for motive power. Such actuators are referred to as pneumatic, electro-hydraulic, or electric actuators. In an instance the actuators are activated and that propels the brakes along the wheels.

In yet another embodiment, the in-wheel electric all-terrain vehicle (100) also includes a torque controlling unit (109) configured to control the torque output at each of the four wheels (104, 106, 108, 110). Furthermore, the torque generated from the engine (102) is transmitted to the wheel drive and delivered at a constant rate. In such an instance, the torque controlling unit may regulate the torque output, when required. Moreover, the torque controlling unit may include gear trains (127) to regulate the torque output.

According to an embodiment, the in-wheel electric all-terrain vehicle (100) includes a powertrain (126) to provide power drive from the engine (102) to at least one of the right front wheel (104), the left front wheel (106), the right rear wheel (108), and the left rear wheel (110). Furthermore, the powertrain (126) includes the engine (102), one or more drive shafts (128), and a final drive (130). As used herein, the powertrain of the vehicle refers to a mechanism for transmitting the drive from the vehicle's engine to its axle. Furthermore, powertrain (126) includes differentials to transmit power from power drive from the engine (102) to at least one of the right front wheel (104), the left front wheel (106), the right rear wheel (108), and the left rear wheel (110), being actuated from one or more drive shafts (128), and a final drive (130). In an embodiment, the powertrain (126) is mounted on each of the right front wheel (104), the left front wheel (106), the right rear wheel (108), and the left rear wheel (110).

According to one embodiment, the in-wheel electric all-terrain vehicle (100) includes an electric in-wheel motor assembly (132) mounted inside each of the four wheels (104, 106, 108, 110). Furthermore, the electric in-wheel motor assembly (132) includes a main shaft (134), one or more stator coils (136), a stator holder (138), a stator coil winding (140), one or more magnets (142), a magnet ring holder (144), one or more bearings (146), a casing (148), one or more internal and external circlips (150).

As used herein, the suspension mechanism (120) comprises tires, tire air, springs (129), shock absorbers and linkages that connects the vehicle to the four wheels and allows relative motion. Further, the suspension mechanism (120) supports road holding/handling and ride quality.

In an embodiment, the in-wheel electric all-terrain vehicle (100) further includes a universal controller (113) to enable functioning of the engine (102), each of the four wheels (104, 106, 108, 110), the steering wheel mechanism (114), powertrain (126) and electric in-wheel motor assembly (132) synchronously.

In another embodiment, the stator holder (138) is mounted inside the main shaft (134), wherein the stator holder (138) is locked with a key or an interference tight fitted component.

In yet another embodiment, the one or more magnets (142) are embedded onto the magnet ring holder (144) through a step design (139) on the casing (148). Further, the casing (148) is mounted on the main shaft (134) over the one or more bearings (146) and is locked using internal and external circlips (150).

Furthermore, in an event the magnet (142) rotates, the casmg (148) is also configured to rotate with the magnets around the axis of the main shaft, wherein the main shaft is fixed in a stationary manner inside the knuckle joints of the suspension system in the vehicle along with wiring harness (141) through the axis of the shaft. In an embodiment, the knuckle joints are configured to hold the wheel motor's main shaft using upper and lower arms of the suspension system The stationary motor shaft is further configured to eliminate the use of solid axle and the drive shafts from the differential gear box and achieve the final drive to the vehicle. Additionally, the casing (148) comprises at least four studs for holding the wheels to drive the vehicle.

Figure 2A:
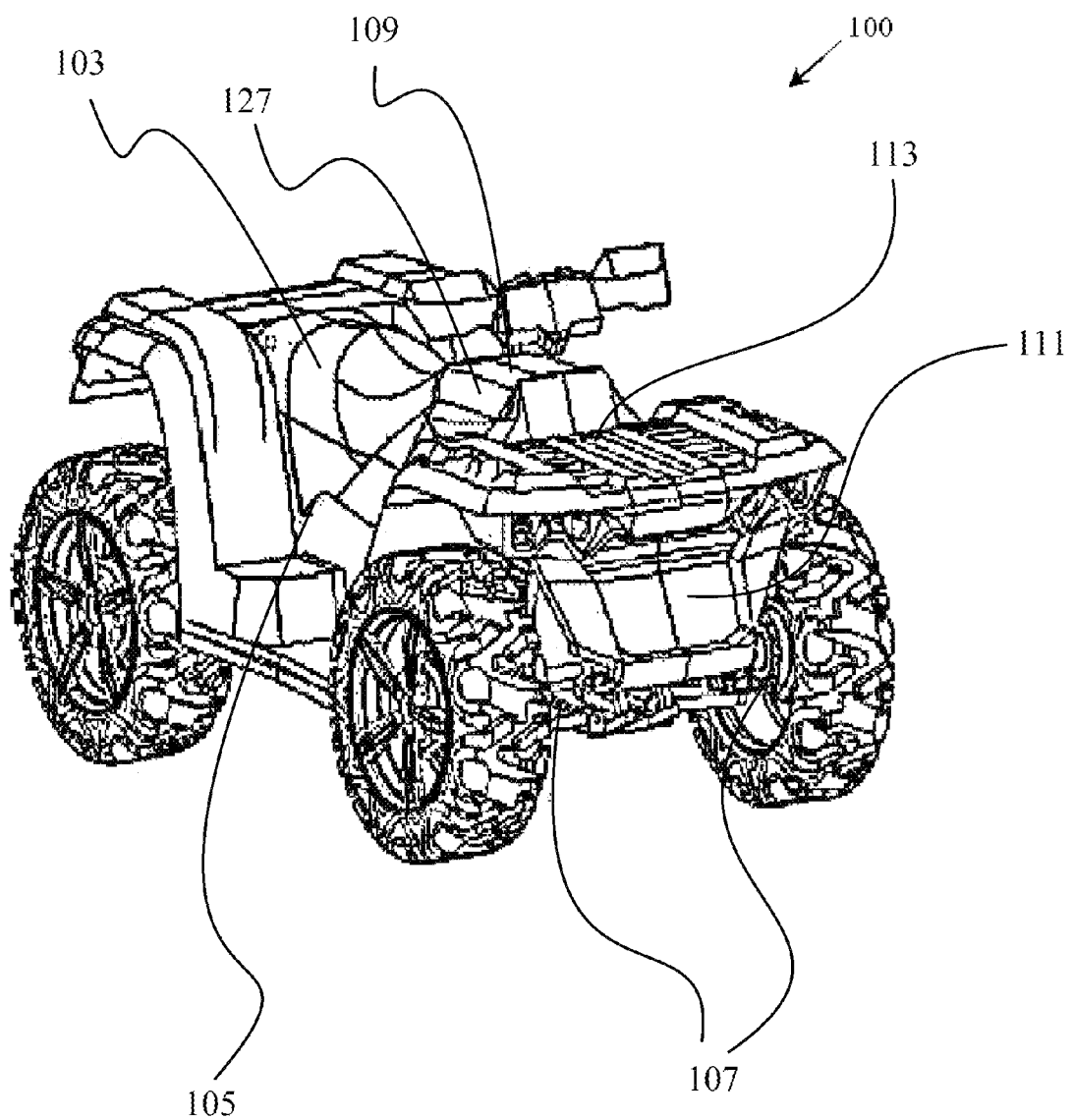
FIGS. 2A and 2B illustrate a schematic diagram of the in-wheel electric all-terrain vehicle (100), according to an embodiment herein.
Figure 2B:
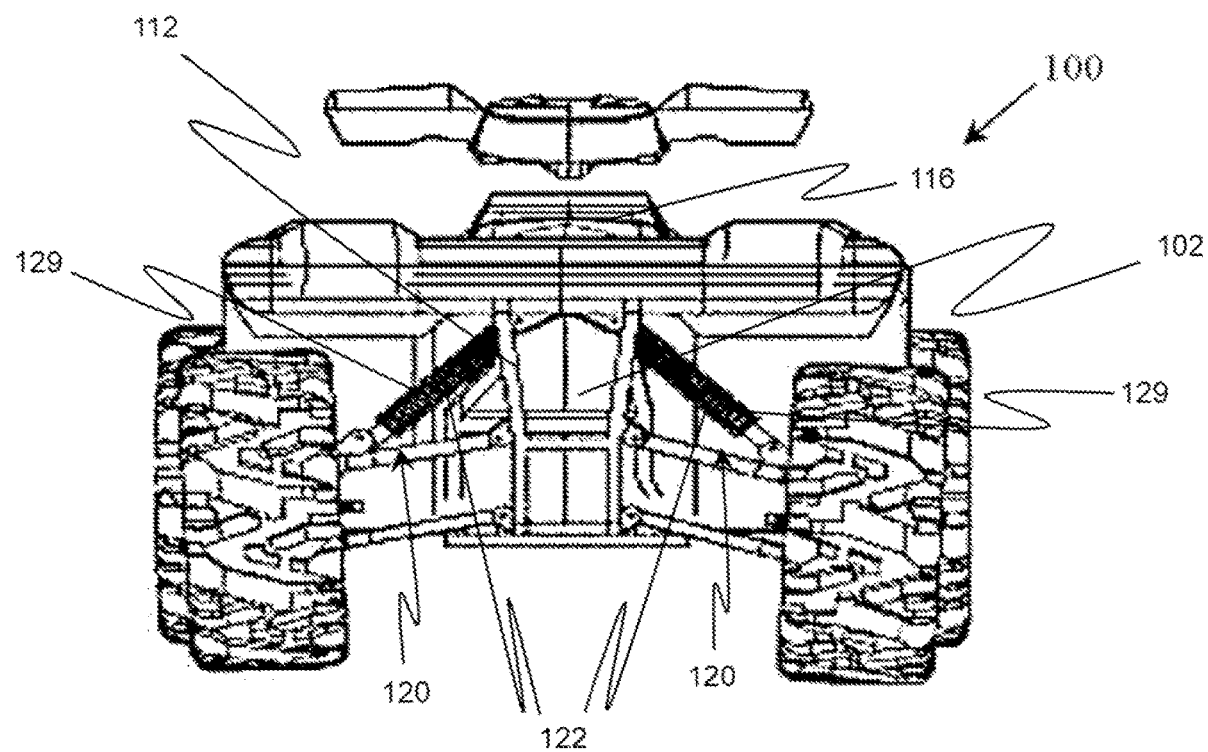

Referring to FIGS. 2A and 2B, the figures illustrate a schematic diagram of the in-wheel electric all-terrain vehicle (100), according to an embodiment herein. As shown, wherein FIG. 2A is a perspective view and FIG. 2B is a rear view of the in-wheel electric all-terrain vehicle (100).

Figure 3:
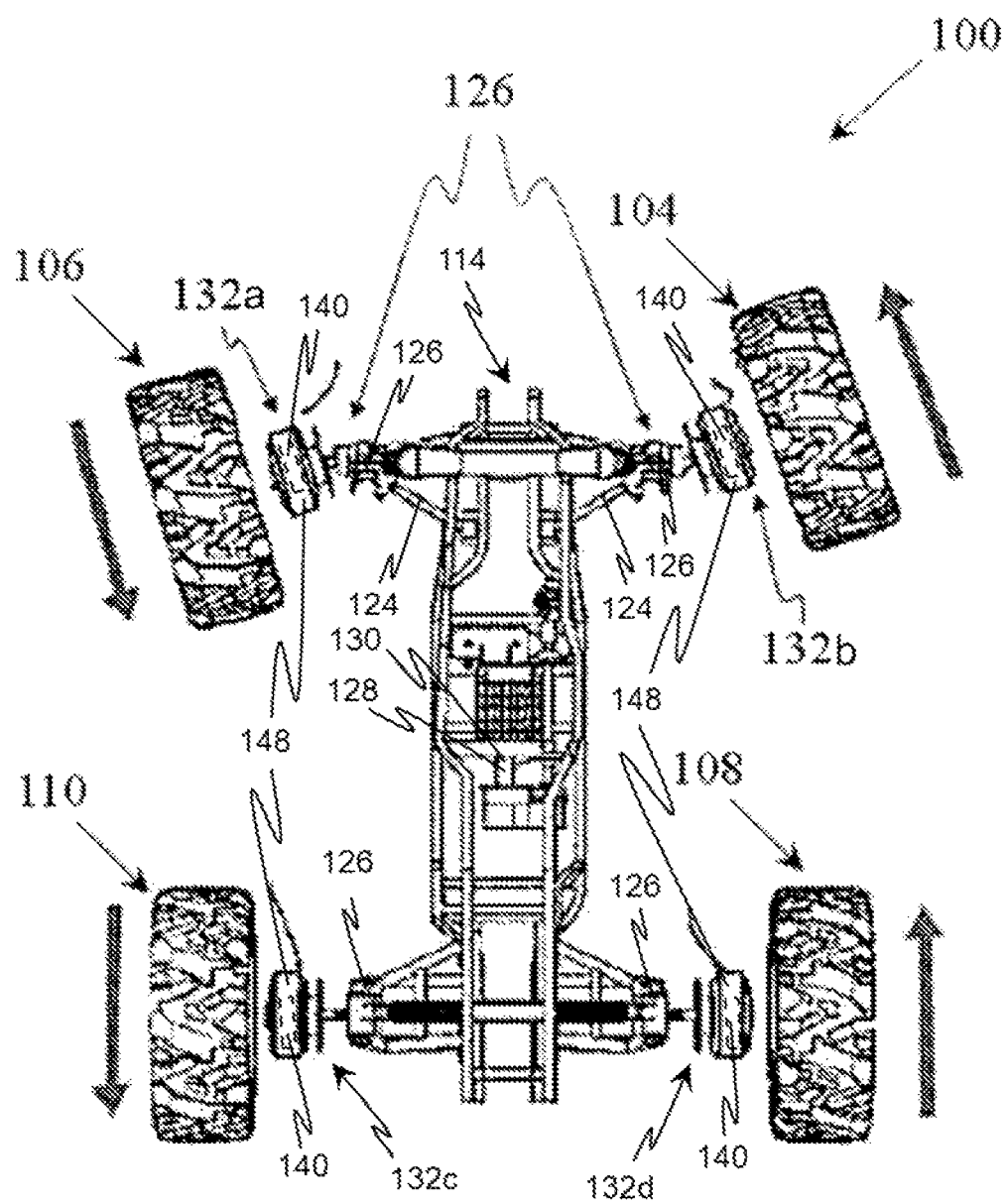
FIG. 3 illustrates a schematic diagram depicting unassembled view of the in-wheel electric all-terrain vehicle (100), according to an embodiment herein.

Referring to FIG. 3, the figure illustrates a schematic diagram depicting unassembled view of the in-wheel electric all-terrain vehicle (100), according to an embodiment herein. Furthermore, there is shown the electric in-wheel motor assembly (132) mounted inside each of the four wheels (104, 106, 108, 110).

Figure 4:
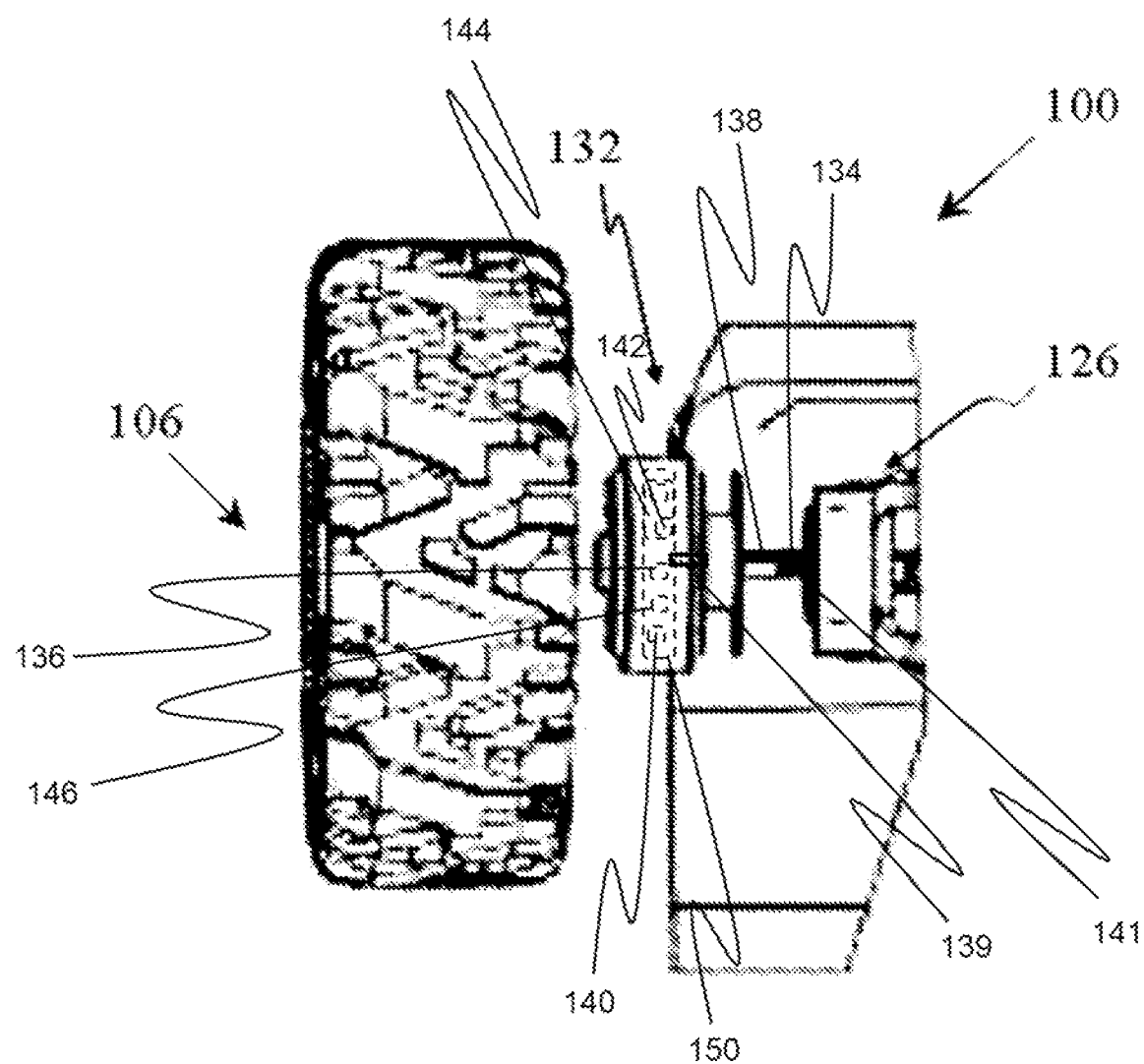
FIG. 4 illustrates a schematic diagram depicting a sectional view of the in-wheel electric all-terrain vehicle (100), according to an embodiment herein.
Figure 5A:
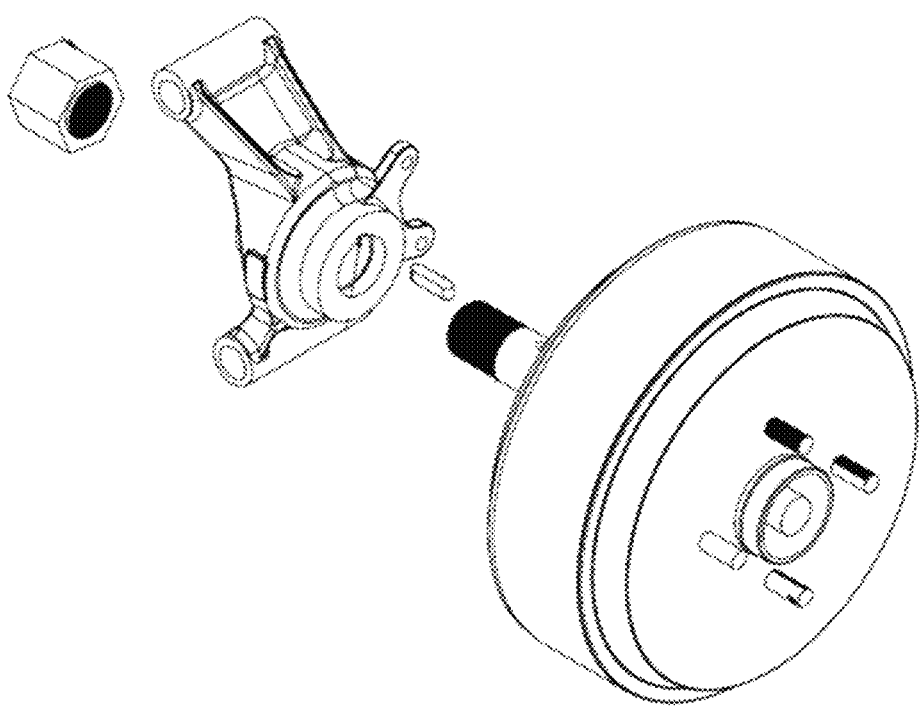
Figure 5B:
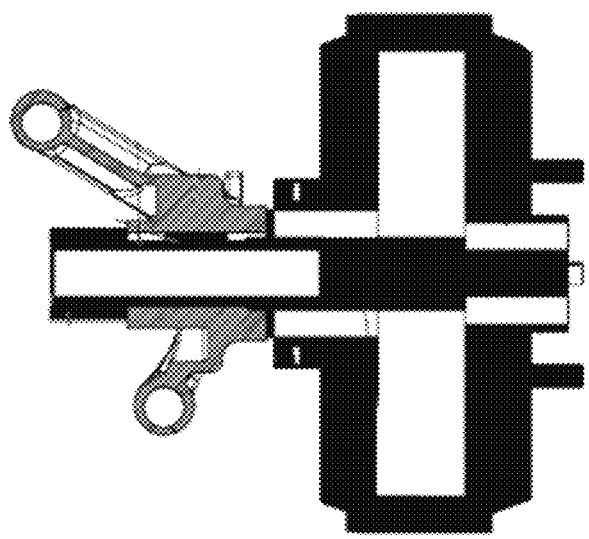

Referring to FIG. 4, the figure illustrates a schematic diagram depicting a sectional view of the in-wheel electric all-terrain vehicle (100), according to an embodiment herein. Further, the present disclosure encompasses independent motors inside each of the four wheels for facilitating flexible speed variations on each of the four wheels, wherein said speed variation facilitates smooth vehicle driving. Also, displacement of each independent motor results in even distribution of the weight across the vehicle, and also increases ground clearance by eliminating the use of axles and differential drives. In an embodiment, the motor is a direct drive to the wheel facilitating weight reduction and reduced noise, vibration and harshness levels and power delivery on wheels. In particular and as shown in FIG. 3, the length of the arrow represents speed variation, wherein the length of the arrow is directly proportional to the speed i.e. larger the arrow, more is the speed. The present disclosure further encompasses providing power to the motor through individual controllers of a battery pack of the vehicle. Furthermore, FIG. 3 illustrates a front section view of the ATV suspension system on the vehicle chassis, a hub wheel motor further comprising a stationary shaft locked in the suspension steering knuckle joints. Further, the ATV suspension mechanism (112) comprises a wheel attached to the hub wheel motor via connecting means such as nuts and bolts, wherein the wheel has a Pitch Circle Diameter (PCD) similar to the PCD of the motor. Similarly, all four wheels of the vehicle are connected to the motor on the right front wheel (104), the left front wheel (106), the right rear wheel (108), and the left rear wheel (110), respectively. The present disclosure enhances vehicle dynamics by refining the handling of the vehicle without the use of any additional power steering unit.

As will be readily apparent to a person skilled in the art, the present invention may easily be produced in other specific forms without departing from its essential composition and properties. The present embodiments should be construed as merely illustrative and non-restrictive and the scope of the present invention being indicated by the claims rather than the foregoing description, and all changes which come within therefore intended to be embraced therein.

We claim:

1. An in-wheel electric all-terrain vehicle (100), including an engine (102) a right front wheel (104), a left front wheel (106), a right rear wheel (108), a left rear wheel (110), a chassis (112), a steering wheel mechanism (114), a straddled seat (116), at least four tyres (118), a suspension mechanism (120), shock absorbers (122), one or more linkages (124), the in-wheel electric all-terrain vehicle (100) comprising:
   a powertrain (126) to provide power drive from the engine (102) to at least one of the right front wheel (104), the left front wheel (106), the right rear wheel (108), and the left rear wheel (110), wherein the powertrain (126) comprises one or more drive shafts (128), and a final drive (130); and
   an electric in-wheel motor assembly (132) mounted inside each of the four wheels (104, 106, 108, 110), wherein the electric in-wheel motor assembly (132) comprises a main shaft (134), one or more stator coils (136), a stator holder (138), a stator coil winding (140), one or more magnets (142), a magnet ring holder (144), one or more bearings (146), a casing (148), one or more internal and external circlips (150), the stator holder (138) being mounted inside the main shaft (134) wherein the stator holder (138) is locked and the main shaft (134) is fixed in a stationary manner inside knuckle joints (147).

2. The in-wheel electric all-terrain vehicle (100) of claim 1, wherein the powertrain (126) to be mounted on each of the right front wheel (104), the left front wheel (106), the right rear wheel (108), and the left rear wheel (110).

3. The in-wheel electric all-terrain vehicle (100) of claim 1, comprises an actuator (105) connected to the chassis (112), wherein the actuator (105) is configured to enable an engaging and disengaging of brakes (107) to wheels.

4. The in-wheel electric all-terrain vehicle (100) of claim 1, further comprises a rechargeable battery pack (111) to provide power to the engine (102).

5. The in-wheel electric all-terrain vehicle (100) of claim 1, wherein the one or more magnets (142) are placed/embedded on the magnet ring holder (144) through a step design (139) on the casing (148).

6. The in-wheel electric all-terrain vehicle (100) of claim 1, wherein the casing (148) is mounted on the main shaft (134) over the one or more bearings (146) and is locked using internal and external circlips (150).

7. An in-wheel electric all-terrain vehicle (100), including an engine (102) a right front wheel (104), a left front wheel (106), a right rear wheel (108), a left rear wheel (110), a chassis (112), a steering wheel mechanism (114), a straddled seat (116), at least four tyres (118), a suspension mechanism (120), shock absorbers (122), one or more linkages (124), the in-wheel electric all-terrain vehicle (100) comprising:
   a powertrain (126) to provide power drive from the engine (102) to at least one of the right front wheel (104), the left front wheel (106), the right rear wheel (108), and the left rear wheel (110), wherein the powertrain (126) comprises one or more drive shafts (128), and a final drive (130); an electric in-wheel motor assembly (132) mounted inside each of the four wheels (104, 106, 108, 110), wherein the electric in-wheel motor assembly (132) comprises a main shaft (134), one or more stator coils (136), a stator holder (138), a stator coil winding (140), one or more magnets (142), a magnet ring holder (144), one or more bearings (146), a casing (148), one or more internal and external circlips (150), the stator holder (138) being mounted inside the main shaft (134) wherein the stator holder (138) is locked and the main shaft (134) is fixed in a stationary manner inside knuckle joints (147), the powertrain (126) being mounted on each of the right front wheel (104), the left front wheel (106), the right rear wheel (108), and the left rear wheel (110); and a rechargeable battery pack (111) to provide power to the engine (102).

8. The in-wheel electric all-terrain vehicle (100) of claim 7, further comprises an actuator (105) connected to the chassis (112), wherein the actuator (105) is configured to enable an engaging and disengaging of brakes (107) to wheels.

9. The in-wheel electric all-terrain vehicle (100) of claim 7, wherein the one or more magnets (142) are placed/embedded on the magnet ring holder (144) through a step design (139) on the casing (148).

10. The in-wheel electric all-terrain vehicle (100) of claim 7, wherein the casing (148) is mounted on the main shaft (134) over the one or more bearings (146) and is locked using internal and external circlips (150).

11. An in-wheel electric all-terrain vehicle (100), including an engine (102) a right front wheel (104), a left front wheel (106), a right rear wheel (108), a left rear wheel (110), a chassis (112), a steering wheel mechanism (114), a straddled seat (116), at least four tyres (118), a suspension mechanism (120), shock absorbers (122), one or more linkages (124), the in-wheel electric all-terrain vehicle (100) comprising:

a powertrain (126) to provide power drive from the engine (102) to at least one of the right front wheel (104), the left front wheel (106), the right rear wheel (108), and the left rear wheel (110), wherein the powertrain (126) comprises one or more drive shafts (128), and a final drive (130);

an electric in-wheel motor assembly (132) mounted inside each of the four wheels (104, 106, 108, 110), wherein the electric in-wheel motor assembly (132) comprises a main shaft (134), one or more stator coils (136), a stator holder (138), a stator coil winding (140), one or more magnets (142), a magnet ring holder (144), one or more bearings (146), a casing (148), one or more internal and external circlips (150), the stator holder (138) being mounted inside the main shaft (134) wherein the stator holder (138) is locked and the main shaft (134) is fixed in a stationary manner inside knuckle joints (147);

an actuator (105) connected to the chassis (112), wherein the actuator (105) is configured to enable an engaging and disengaging of brakes (107) to wheels; and a rechargeable battery pack (111) to provide power to the engine (102).

12. The in-wheel electric all-terrain vehicle (100) of claim 11, wherein the one or more magnets (142) are placed/embedded on the magnet ring holder (144) through a step design (139) on the casing (148).

13. The in-wheel electric all-terrain vehicle (100) of claim 11, wherein the casing (148) is mounted on the main shaft (134) over the one or more bearings (146) and is locked using internal and external circlips (150).

* * * * *